United States Patent

[11] 3,595,508

[72] Inventor John E. Knight
 Duncan, Okla.
[21] Appl. No. 37,069
[22] Filed May 14, 1970
[45] Patented July 27, 1971
[73] Assignee Halliburton Company
 Duncan, Okla.

[54] APPARATUS SECURING CONTAINER TO AIRCRAFT AND OTHER VESSEL CARGO COMPARTMENT FLOORS
 1 Claim, 10 Drawing Figs.
[52] U.S. Cl. ................................................ 248/146,
 105/366 C, 248/119 R, 296/15
[51] Int. Cl. .................................................. B61d 17/00
[50] Field of Search ......................................... 248/146,
 128, 129, 149, 150, 154, 119 R; 214/15; 296/15;
 105/366 C, 366 B, 369 A

[56] References Cited
UNITED STATES PATENTS
| 2,056,179 | 10/1936 | Fitch | 105/366 B X |
| 2,136,443 | 11/1938 | Kepler | 248/146 x |
| 2,366,337 | 1/1945 | Kreuter et al. | 248/119 R X |
| 2,731,334 | 1/1956 | Wissmiller et al. | 248/146 X |
| 2,923,542 | 2/1960 | Clark et al. | 248/127 X |

Primary Examiner—J. Franklin Foss
Attorney—John H. Tregoning

ABSTRACT: This invention relates to a tank unit which can be transported by aircraft and more particularly to the structure of the tank-supporting unit and its fastening devices which are able to withstand forces bearing on the tank unit through normal aircraft operation as well as considerable forces induced thereon through turbulent weather and forced landings.

John E. Knight
INVENTOR.

ATTORNEY

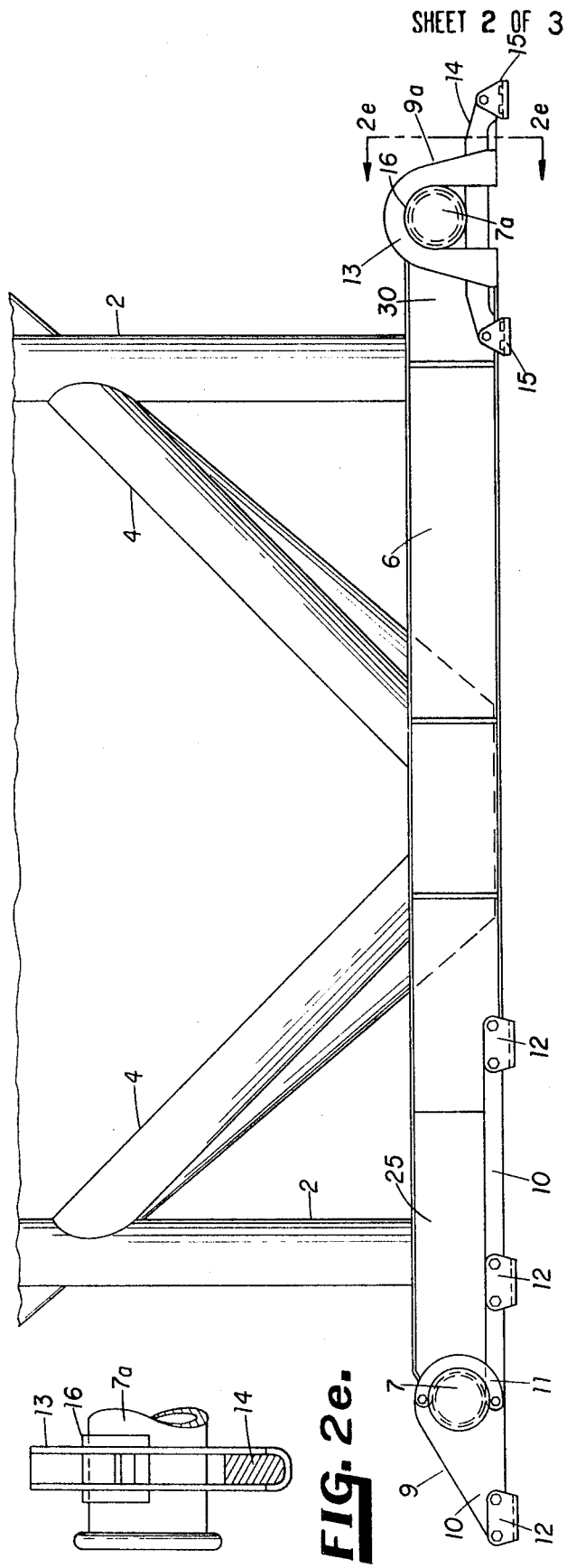
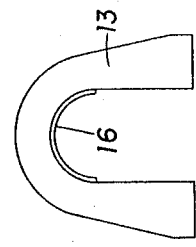
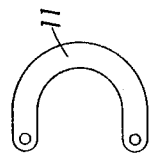
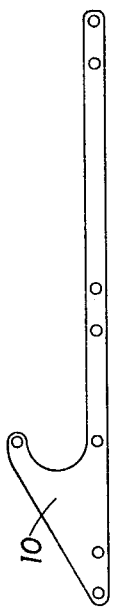

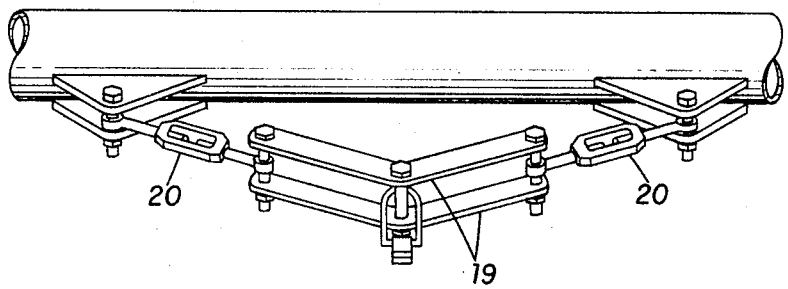
FIG. 3a.
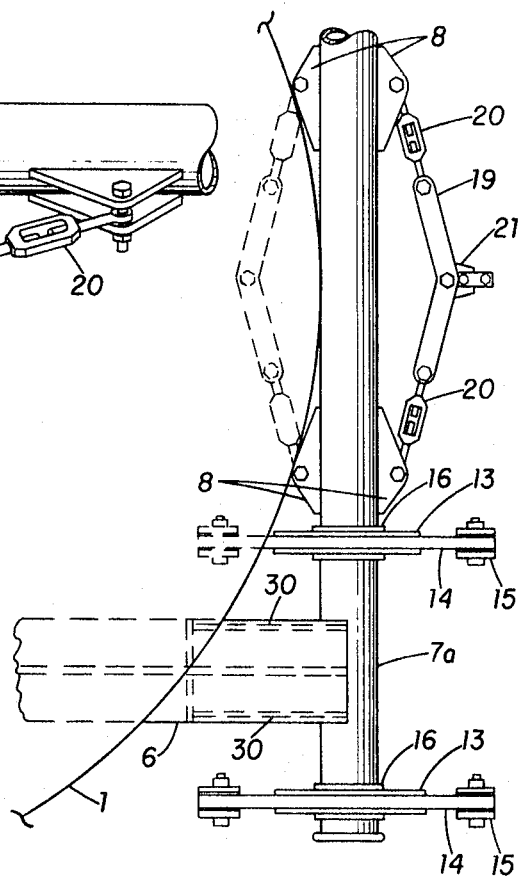
FIG. 4.
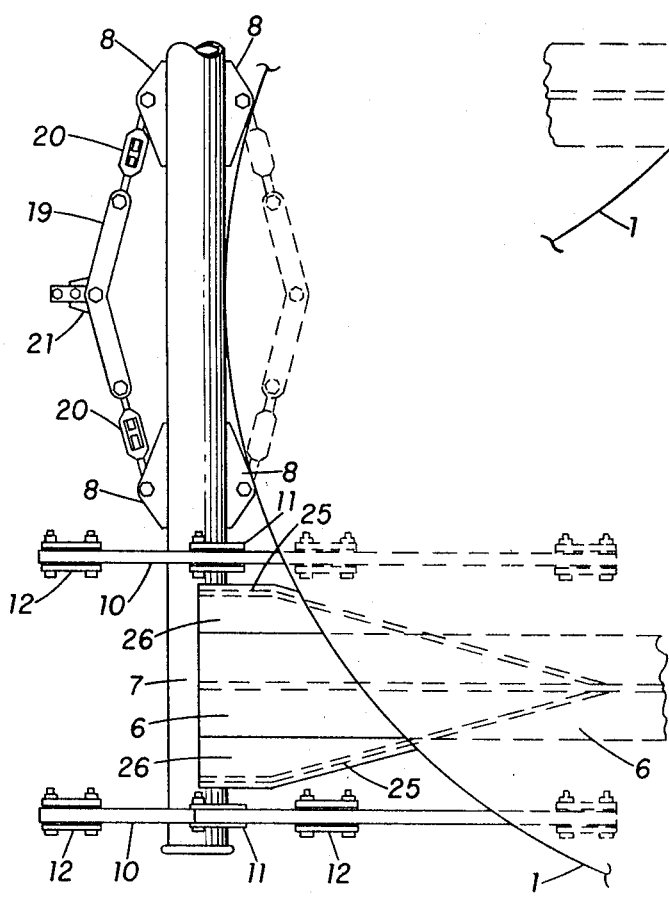
FIG. 3.
John E. Knight
INVENTOR
ATTORNEY

APPARATUS SECURING CONTAINER TO AIRCRAFT AND OTHER VESSEL CARGO COMPARTMENT FLOORS

BACKGROUND OF THE INVENTION

Particulate material such as dry bulk cement have repose angles such that tanks used in their storage usually have hopper or funnel-shaped bottoms corresponding to these angles in order to effect complete and efficient discharge of the material by pneumatic means. As a result of such design, these tanks have a high center of gravity, a factor which is very important in transporting them. In fact, this factor plus the weight of the tank have heretofore prevented transportation of these tanks by aircraft. Forces, induced by aircraft operation in taking off and landing, by turbulent weather, and by vertical air drafts, complement the high center of gravity and weight of the tanks to create stresses and strains against the tank and its supporting structure and fastening devices. Such forces could cause the tank unit to come apart or break loose from its moorings and crash through the sides of the aircraft, or through the front via the pilots cabin. The magnitude of these forces which the tank unit and fastening devices must successfully withstand to prevent such catastrophes has been determined by the Federal Aviation Agency and are as follows:

| Direction The Force Acts On The Tank Unit | Force In Terms of Gravitational Units |
| --- | --- |
| Forward | 9.0 |
| Backwards | 1.5 |
| Upward | 2.1 |
| Downward | 5.1 |
| Sideways | 1.5 |

SUMMARY OF INVENTION

The present invention provides an aircraft-transportable tank unit which includes a storage tank for particulate material, a supporting structure for the tank and adjustable means to fasten the unit securely to the aircraft floor. In order to more fully describe the present invention, reference is made to the accompanying drawings wherein:

FIG. 1 is a perspective view of the tank and its supporting structure;

FIG. II is a side view of the tank and supporting structure of FIG. I and of the fastening means used to fasten the supporting structure to a floor;

FIGS. IIa through IIe illustrate the components of the fastening means of FIG. II;

FIG. III is a plan view of the left front and center front of the tank and supporting structure of FIG. I;

FIG. III a is a front view of a portion of the supporting structure of FIG. III;

FIG. IV is a plan view of the left rear and center rear of the tank and supporting structure of FIG. 1.

DETAILED DESCRIPTION

Figure 1:
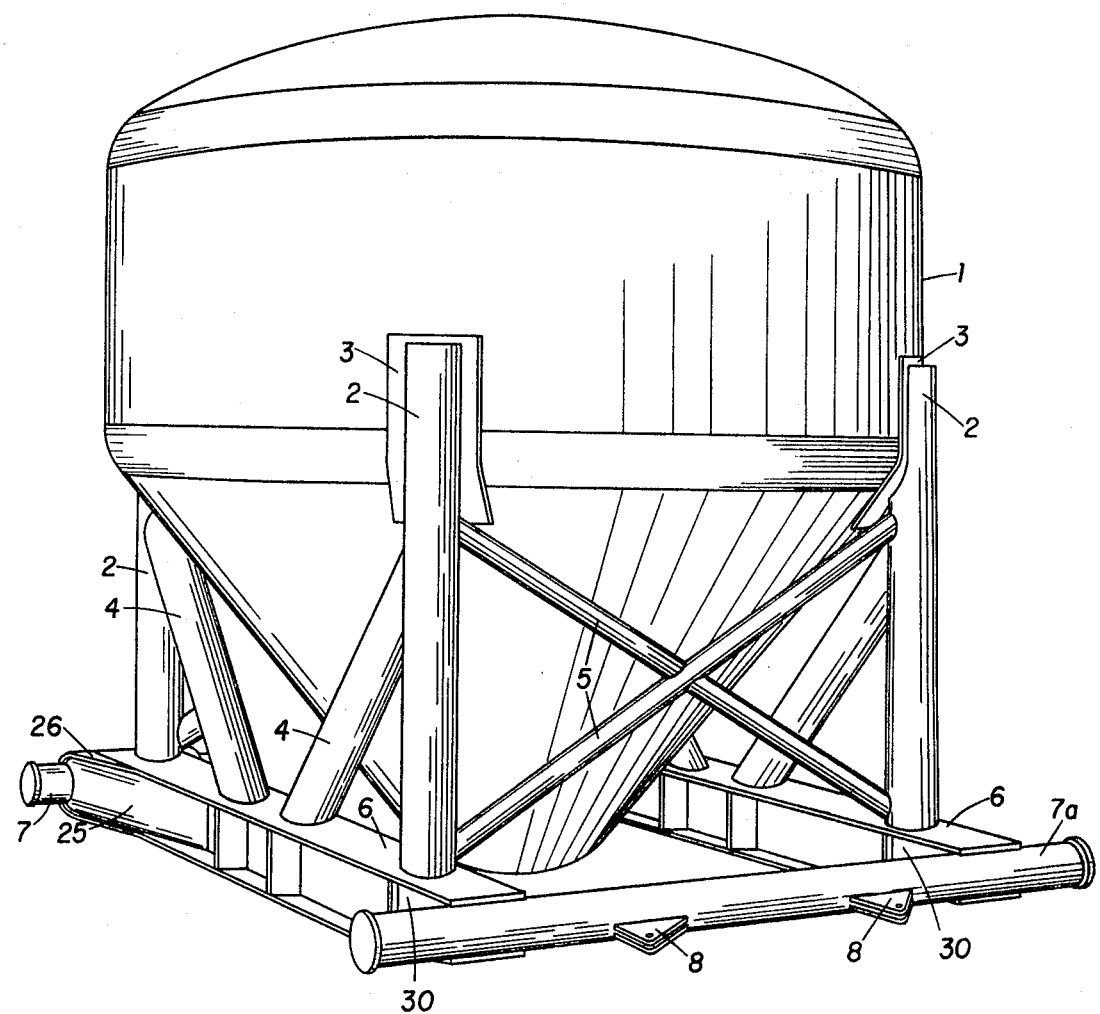

In FIG. I, tank 1 is attached to first floor members 6 through legs 2. Reinforcing plates 3 are between legs 2 and tank 1 to strengthen that point of attachment. Support means 4 and 5 provide structural strength to legs 2 and first floor members 6. Attached to first floor members 6, across the ends thereof, are second floor members 7 and 7a. Attached at a 24° angle from the horizontal to second floor member 7 and 7a and on both sides thereof are adjusting member 8. First flange members 25 and 26 are attached to first floor members 6 and second floor member 7. As will be clear in FIG. III, member 25 angles out from first floor members 6, bends back to run parallel with first floor members 6 until it abuts and is affixed to second floor member 7. Members 25 are positioned on both sides of first floor members 6. Members 26 are positioned on both top and bottom of member 25 and are also attached to first and second floor members 6 and 7. Second flange members 30 are positioned parallel and attached to either side of first floor members 6, abuts and is attached to second floor member 7a.

Turning now to FIG. II, a side view of the tank-supporting structure, the fastening means 9 which latches the unit to the aircraft floor (not shown) are illustrated. At the front end of the structure is bar 10 adapted to be fastened to lugs 12. Freight-hauling aircraft have built into the cargo compartment floor a lattice of wells or pits (not shown) spaced twenty inches apart. A D-ring is normally bolted into each well. In the present embodiment, the D-rings positioned adjacent to bar 10 have been replaced with lugs 12 which extend above the floor surface a sufficient distance to permit the bolting of said bar 10 to lugs 12. Extending up and to the right, bar 10 defines a semicircle whose radius is such as to just fit on to the second floor member 7. Completing the circle and fully encompassing second floor member 7 is the function of brackets 11 of which there are, in this embodiment, two per bar 10. Brackets 11 are placed one on each side of bar 10 and bolted together through apertures provided. Referring to FIGS. IIa and IIb, bar 10 and bracket 11 are shown singly to illustrate their construction. At the rear of the unit is the second fastening means 9a. Hook 13 slips down over second floor member 7a. A semicircular-shaped plate 16, attached to hook 13 as shown in FIGS. IIc and IIe, provide a larger mating surface between hook 13 and second floor member 7a. Referring to FIG. IIe, one sees the double-wall construction of said hook 13. This permits rod 14 to slide through hook 13 beneath second floor member 7a. By allowing rod 14 to so slide, attaching rod 14 to lugs 15 is possible even where the unit's overall dimensions do not correspond to the lattice of wells referred to above. Lugs 15, as are lugs 12, are bolted to the base of said wells, extending above the floor surface to permit the bolting of rod 14 thereto. To permit the adjusting feature of fastening means 9a, second floor member 7a is located at a greater height from the aircraft floor surface (not shown) than is second floor member 7. Referring now to FIG. IIc and IId, hook 13 and rod 14 are shown to illustrate their construction. FIG. IIe shows the double-wall construction of hook 13 and the plate 16.

As FIG. III shows, there are two sets of fastening means 9 and/or 9a at each corner of the tank-supporting structure. Each set grips second floor member 7 or 7a as the case may be, on either side of first floor member 6. Besides showing the arrangement of bars 10 and brackets 11 referred to above, FIG. III introduces the third fastening assembly. Adjusting means 19 is composed of two elbow-shaped pieces bolted together one over the other. In bolting the two pieces together, turnbuckles 20 are bolted therein at either end of adjusting means 19 and aircraft D-ring 21 is bolted therein at the midpoint of adjusting means 19. In turn, turnbuckles 20 are bolted to flanges 8 located on second floor members 7 and 7a and aircraft D-ring 21 is bolted into one of the wells in the aircraft floor. Note that the angle of attachment (24° from the horizontal) of flanges 8 to second floor members 7 and 7a allow the D-ring 21 to fit into adjusting means 19. FIG. III also illustrates the positioning and angle of flange members 25, shown as dashed lines in the drawing. Members 25 are rigidly attached to first floor member 6 and second floor member 7. To enable members 25 to abut second floor members 7 directly, said members 25 have been bent 15° in toward the first floor member 6. It is apparent that the surface against which second floor member 7 is positioned has been increased, thus strengthening the juncture and the supporting structure. Flange member 26, one which is also on the bottom, is rigidly attached to member 25 and first and second floor members 6 and 7. FIG. IIIa is a frontal view of adjusting means 19 showing the construction thereof and places of contact for turnbuckles 20 and D-ring 21.

Referring now to FIG. IV, which is a plan view of the left rear portion of the unit, flange members 30, indicated by dashed lines, are welded to first and second floor members 6 and 7a. FIG. IV also reveals the embodiment of placing the second fastening means (hook 13, rod 14, and plate 16) on either side of first floor member 6. Also shown is third fastening means, adjusting means 19, turnbuckles 20 and D-ring 21, and identical structure as shown in FIGS. III AND IIIa. Note that adjusting means 19, turnbuckles 20, and D-ring 21 are placed on both sides of second floor members 7 and 7a.

When the illustrated apparatus is placed in operation, forces acting on the tank 1 and its supporting structure are distributed throughout the structure by support means 4 and 5, and flange members 25, 26, and 30. Members 25 and 26 distribute and thus reduce the intensity of the forces acting toward the front of the tank and supporting structure by providing an enlarged area of attachment between first and second floor members 6 and 7. Members 30, by providing an enlarged area of attachment between first and second floor members 6 and 7a, reduce the intensity of forces acting toward the back of the tank and supporting structure in the same manner. Thus, no one area or fastening means receives all the impact of the forces induced by aircraft operation and turbulent weather. Adjusting means 19, of which there are a total of four in this particular embodiment, absorb forces acting on the tank and the supporting structure from either side. The turnbuckles 20 are provided to allow the mating of adjusting means 19 with aircraft D-ring 21 and to take up any slack existing between the supporting structure and the floor. Fastening means 10, 11, 12, 13, 14, 15 and 16 prevent forward, backward, and upward movement of the tank unit relative to the floor of the aircraft.

Weight of the tank and supporting structure are very important for two reasons; (1) weight increases the need for structural strength, and (2) weight decreases the payload the aircraft can carry. To counteract these effects the tank 1 and all components of the supporting structure are made from aluminum, preferably light weight metal having high strength and some elasticity. Legs 2, support means 4 and 5, and second floor members 7 and 7a are preferably made from aluminum tubing. First floor members 6 are preferably made from aluminum I-beams. Aluminum plate is preferably used elsewhere.

First floor members 6 are bent up at either end to form skids to facilitate the moving of the tank unit on and off the aircraft as well as elsewhere. In its normal usage however, the tank unit will remain on the aircraft and the particulate material loaded and unloaded therefrom by pneumatic means.

Dry bulk cement is only one type of particulate material which can be transported by air in the above-described tank unit. Other material and even liquids can also be shipped by air utilizing this invention.

It will be understood that other and further forms of the invention may be devised without departing from the spirit and scope of the appended claims.

What I claim is:

1. An aircraft transportable tank unit for transporting large volumes of particulate material which comprises:
   a. a tank
   b. two sets of legs, each set fixed to said tank in parallel spaced relationship;
   c. a pair of first floor members, each attached in parallel to one set of said legs;
   d. a pair of second floor members fixed to said first floor members each at one end and at right angles to said first floor members;
   e. four sets of first flange members, each set fixed to each side of one end of each of said first floor members and to each of said second floor members in the vicinity of the attachment of the said second floor members to the said first floor members;
   f. four sets of second flange members, each set fixed to each side of another end of each of said first floor members and said second floor members in the vicinity of the attachment of the second floor member to the said first floor member;
   g. four sets of adjusting means, each set attached on each longitudinal side of each of said second floor members, adapted to attach said second floor members to said aircraft floor;
   h. a plurality of first fastening means attaching one of said second floor members to said aircraft floor;
   i. a plurality of second fastening means attaching another one of said second floor members to said aircraft floor;
   j. a plurality of first support means fixed both to said legs and to said first floor members;
   k. a plurality of second support means fixed to and between said legs.

2. The tank unit of claim 1 wherein said tank unit is constructed of high strength, lightweight metal.

3. The tank unit of claim 1 wherein said tank unit is constructed of aluminum.

4. The tank unit of claim 1 wherein said first floor members are bent upward at either end, whereby movement of said tank unit is facilitated.

5. The tank unit of claim 1 wherein said first fastening means is provided with:
   a. a plurality of bars having an extension defining a concave semicircle adapted to partly encircle said second floor member; and
   b. a plurality of brackets defining a concave semicircle adapted to partly encircle said second floor member, said brackets adapted to fasten to said bars.

6. The tank unit of claim 1 wherein said second fastening means is provided with:
   a. a plurality of rods adapted to be fastened to said aircraft floor;
   b. a plurality of inverted U-shaped hooks adapted to fit down over said second floor members, said hooks apertured to slidably receive said rods; and
   c. a plurality of curved plates affixed to said hooks at the point of the interior curvature of said hooks.

7. The tank unit of claim 1 wherein said adjusting means is provided with:
   a. a plurality of sets of two elbow-shaped arms bolted together; and
   b. means connecting said sets of arms to said second floor members.

8. The adjusting means of claim 7 wherein said means connecting said sets of arms to said second floor members comprise adjustable turnbuckles.

9. The tank unit of claim 1 wherein each of said sets of first flange members comprise:
   a. a rectangular, angled plate, one end defining a concave semicircle adapted to partly encircle said second floor member; and
   b. two plates, having one end terminating in a point, said plates adapted to be affixed to both top and bottom of said rectangular, angled plates.

10. The first flange members of claim 9 wherein said rectangular, angled plate has one portion thereof bent at an angle of 15° relative to the remaining portion.

11. The tank unit of claim 1 wherein each of said sets of second flange members comprises a rectangular plate having one end thereof defining a concave semicircle adapted to partly encircle said second floor member.